May 12, 1936. C. R. SODERBERG 2,040,218

TURBINE GLAND

Filed April 20, 1934

WITNESSES:
E. H. Lutz
James K. Mosser

INVENTOR
CARL R. SODERBERG.
BY
A. B. Russ
ATTORNEY

Patented May 12, 1936

2,040,218

UNITED STATES PATENT OFFICE 2,040,218

TURBINE GLAND

Carl R. Soderberg, Swarthmore, Pa., assignor to Westinghouse Electric & Manufacturing Company, East Pittsburgh, Pa., a corporation of Pennsylvania Application April 20, 1934, Serial No. 721,532

6 Claims. (Cl. 286—10)

My invention relates to turbine glands of the radial labyrinth type and it has for an object to provide apparatus of this character wherein the component parts may be assembled without shrinking on of any of the parts.

A further object of my invention is to provide labyrinth packing comprised by overlapping collar elements provided with removable and axially-extending sealing or wearing strips carried by the stationary collar elements and which define sealing clearances with respect to the rotatable collar elements.

A further object of my invention is to provide a labyrinth packing consisting of a series of radial labyrinth groups wherein the spindle-carried portions of the groups are provided by collars integral with a sleeve connected to the spindle and cooperating with stationary collars having circumferential sealing or wearing strips, both the stationary collars and the strips being made in arcuate or semi-circular sections to permit of assembly and dismantling of the packing.

A further object of my invention is to provide a labyrinth packing characterized by a large number of throttlings in a given space.

A further object of my invention is to provide a gland of the labyrinth type consisting of a series of radial labyrinth groups wherein the rotary parts are provided by axially-spaced collars integral with a sleeve, the sleeve being spaced from the spindle except for the outer end portion thereof, and the outer end portion constituting a part of the connecting means with the spindle, whereby the major portion of the sleeve and the collars is free to expand without restraint by the rotor body in case of heat being generated by any rubbing of the packing elements, thus relieving the points where rubbing occurs.

A further object of my invention is to provide a gland between a turbine spindle and its housing consisting of a series of axially-aligned radial labyrinth groups each consisting of radially-overlapping fixed and rotatable collars, with the rotatable collars integral with a sleeve connected at its outer end to the spindle and with the stationary collars carried by the housing and made in semi-circular parts to permit assembly and dismantling, the circular and coaxial sealing strips being formed by registering semi-circular parts carried by the semi-circular parts of the stationary collars and being readily mounted on and removable from the semi-circular parts so as to permit of their replacement.

These and other objects are effected by my invention as will be apparent from the following description and claims taken in connection with the accompanying drawing, forming a part of this application, in which:

Figures 1, 2, 3:
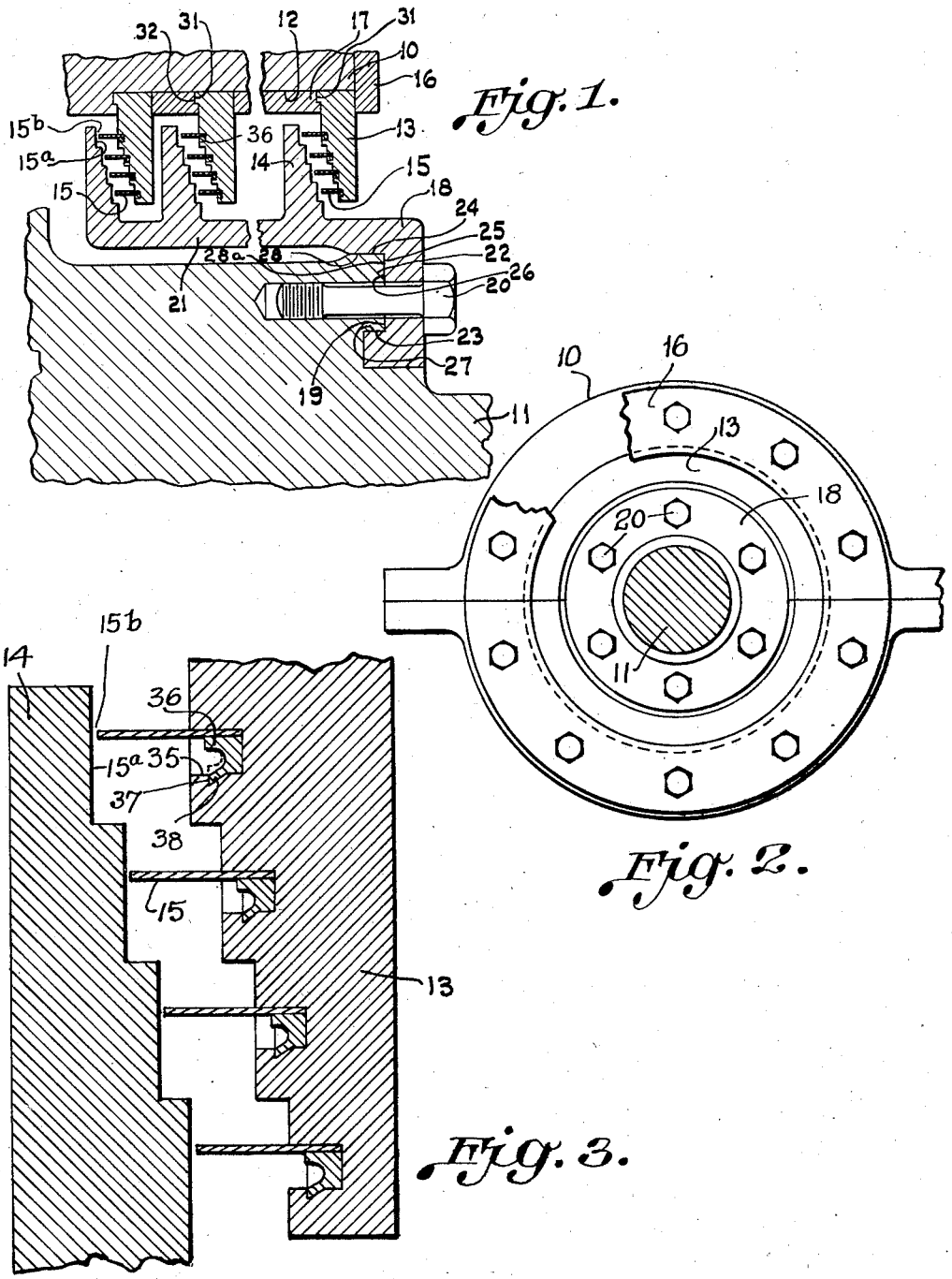
Fig. 1 is a sectional detail view of my improved gland.
Fig. 2 is an end elevation of apparatus shown in Fig. 1.
Fig. 3 is a detail view drawn to an enlarged scale showing how the sealing strips are connected to the fixed collars.

In the drawing, the turbine housing and the spindle are respectively indicated at 10 and 11, the housing having a cylindrical socket 12 coaxial with the spindle.

The socket 12 has disposed therein a plurality of axially-spaced pairs of cooperating fixed and rotatable collars 13 and 14, each of the fixed collars having coaxial circular metallic sealing strips 15 extending laterally from one face thereof and cooperating with the adjacent rotatable collar 14.

The fixed collars 13 are shown confined in the socket 12 by the clamping ring 16, the collars being maintained in spaced relation by the spacing collars 17; however, it is to be understood that the collars 13 may be secured to the stator in any suitable manner.

A ring 18 is attached to the spindle by the annular tongue-and-groove connection 19 and by the screws or bolts 20, the ring having an inwardly-extending sleeve portion 21, which is spaced from the spindle. The rotatable collars 14 are integral with the sleeve portion 21.

The annular tongue-and-groove connection 19 includes a tongue 22 provided on the spindle and having inner and outer coaxial cylindrical surfaces 23 and 24 and an end surface 25 which is normal to the spindle axis. The ring 18 has a groove 26 provided with inner and outer cylindrical surfaces 27 and 28 and a bottom surface 28a which accurately fit the tongue surfaces 23, 24, and 25, respectively, whereby it is assured that, when the ring is in place, the sleeve portion 21 will be accurately centered and retained in place with respect to the spindle axis.

As shown in Fig. 2, each of the fixed collars 13, as well as the sealing strips 15 carried thereby, are split or made in semi-circular sections to provide for assembly and dismantling of the apparatus. The semi-circular sections of the collars 13 are provided with semi-circular lateral tongues 31 at their outer edges, the tongues being arranged to fit in grooves 32 formed in the end wall of the socket and in the spacing rings 17, whereby it is assured that, when assembled, the component parts of the fixed collars will be accurately held in circular formation with the ends of the sealing strips in circumferential alignment.

As will appear from Figs. 2 and 3, each semi-circular fixed collar half or section is provided with similar arcuate grooves 35 within which are disposed the semi-circular sealing strip sections, each sealing strip section being clamped against one wall of a groove 35 by a deformable caulking strip 36 fitting between the latter and the other wall of the groove, said other wall of the groove preferably being recessed to provide an inwardly-facing arcuate shoulder 37 and the deformable strip having a tongue 38 which may be rolled or pressed behind the shoulder so as to clamp the sealing strip firmly in place. The caulking strip before deformation is indicated by dot and dash lines at the upper portion of Fig. 3. As the walls of grooves 35 engaged by the sealing strips 30 are cylindrical surface elements coaxial with the spindle axis, it will be apparent that bending of the strips incident to caulking thereof against said groove walls results in cylindrical sealing strips carried by the fixed collars and extending toward and defining sealing clearances with respect to the rotatable collars. If it is desired to replace the sealing strips in case of wear or for any other reason, this may be readily done, for, by having the fixed collars made in sections, the ends of the deformable strips are accessible to be pried out at the ends of the grooves, whereupon such pried-out ends may be engaged by a tool of the key type, the tool being turned and the deformed packing strip being wrapped thereabout, the tongue 38 being sheared off by the shoulder. Upon removal of a sealing strip, a new sealing strip and deformable packing may be inserted.

As will be apparent from Fig. 1, each stationary collar 13 has a group of axially-extending strips 15 whose free edges cooperate with radially-extending sealing faces 15a on the cooperating moving collar 14. The strips of each group preferably radially overlap so that the radial clearances 15b are progressively offset, whereby there is provided a devious flow path for leakage medium and the resistance to flow is consequently increased. As the strips 15 are made of thin metal, they are radially wearable in case of rubbing. Furthermore, with strips made of thin metal, preforming of the strips is unnecessary, as the cylindrical formation is assumed incident to assembly. From the foregoing, it will be apparent that I have provided a spindle and a housing which are separated to provide an annular space together with rotatable and fixed overlapping collars extending radially into said space and carried, respectively, by the spindle and by the housing. The housing includes complementary parts, and, for this reason as well as to permit assembly of the housing parts with the fixed collars extending into the spaces between adjacent rotatable collars the fixed collars are also made in complementary parts carried by the housing parts. The housing is provided with an interior cylindrical socket including complementary portions in the complementary housing parts, and the outer margins of the fixed collar parts are fastened in the complementary socket portions. As the sealing strips are carried by the fixed collars, they are free of centrifugal effects and may be made relatively wide and thin. Furthermore, thinness of the strips gives the requisite flexibility facilitating assembly and cylindrical conformation thereof when assembled; and thinness, taken with a choice of suitable material, provide for wear in case of rubbing so that very fine running clearances may be provided. The strips may be readily secured in position and removed particularly, as the fixed collars are made in semi-circular sections, whereby strips may be readily placed in grooves of complementary collar parts and caulked with the adjacent ends finished or trued so as to aline and fit closely together in order to aggregate a cylindrical sealing strip. Furthermore, by having the fixed collars made up of complementary parts, each carrying complementary parts of the sealing strips, the ends of the caulking are exposed so that they may be readily pried up incident to removal thereof when taking out a sealing strip. Also, as the rotatable collars are carried by a sleeve spaced from the spindle, a structure is provided which is self-relieving in case of rubbing.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a gland for sealing a turbine spindle with respect to its housing including cooperating and axially-spaced pairs of radially-overlapping rotatable and fixed collars, the fixed collars being carried by the housing and the rotatable collars having radially extending sealing faces, a plurality of coaxial and thin metallic strips extending laterally from one side of each fixed collar and defining radially extending sealing clearances with respect to the radially-extending sealing faces of the adjacent rotatable collars, means for connecting the strips to the fixed collars, each of said fixed collars and the strips carried thereby being comprised by registering semi-circular sections, a sleeve integral with the rotatable collars and overhanging the spindle in spaced relation except for the outer end portion thereof, and means for connecting the outer end portion of the sleeve to the spindle.

2. In a gland for sealing a turbine spindle with respect to its housing including cooperating and axially-spaced pairs of radially-overlapping rotatable and fixed collars, the fixed collars being carried by the housing and the rotatable collars having radially-extending sealing faces, a plurality of coaxial and thin metallic strips extending laterally from one side of each fixed collar and defining radially-extending sealing clearances with respect to the radially-extending faces of the adjacent rotatable collar, means for connecting the strips to the fixed collars, a sleeve integral with the rotatable collars and overhanging the spindle in spaced relation except for the outer end portion thereof, said spindle having an annular tongue defined by cylindrical surfaces coaxial with the spindle axis and by a surface normal to said cylindrical surfaces and said outer end portion of the sleeve having a groove defined by cylindrical surfaces and a bottom surface accurately fitting said tongue surfaces and the cylindrical surfaces of the groove being coaxial with its axis and the bottom surface thereof being normal to said axis, and screws for holding the sleeve and the spindle together.

3. In a gland for sealing a spindle with respect to its housing, a plurality of pairs of radially overlapping rotatable and fixed collars, the fixed collars being carried by the housing and the rotatable collars having radial sealing faces, a group of coaxial sealing strips cooperating with the sealing faces of each rotatable collar to define a plurality of radially-extending sealing clearances, means providing for attachment of the groups of strips to the respective stationary collars, a sleeve integral with the rotatable collars and overhanging the spindle in spaced relation with respect to the latter except for the outer end portion thereof, and means for connecting the outer end portion of the sleeve directly to the spindle.

4. In combination with a housing having a cylindrical socket, a spindle coaxial with the socket, a plurality of axially spaced and radially overlapping rotatable and fixed collars, said rotatable collars having radially-extending sealing faces, coaxial and circular thin metallic strips extending from one face of each of said fixed collars and cooperating with the radially extending sealing faces of the adjacent rotatable collar to define radially-extending sealing clearances, means for connecting the strips to the fixed collars, each of said fixed collars and the metallic strips carried thereby being comprised by complementary arcuate sections, means for confining the sectional fixed collars in axially spaced relation in said socket, a sleeve integral with the rotatable collars and spaced from the spindle except for the outer end portion thereof, and means for connecting the other end portion of the sleeve to the spindle and providing for centering of the sleeve with respect to the latter.

5. The combination with a housing having complementary parts providing an interior axially-extending opening and a spindle extending through said opening and separated from the wall of the latter by an annular space, of a cooperating pair of radially overlapping fixed and rotatable collars extending into said annular space and carried by the housing and by the spindle, respectively, said fixed collar including complementary parts carried by the respective complemental parts of the housing and said fixed collar having one or more circular grooves formed in a single side thereof, each circular groove having a wall which is cylindrical and each groove including complementary portions provided in the respective complementary fixed collar parts, a cylindrical sealing strip element in each groove conforming to and seated against the cylindrical wall thereof and cooperating with the adjacent side of the rotatable collar to define sealing clearance, each sealing strip element including complementary parts of relatively thin and flexible metallic strip material arranged in the respective complementary portions of each groove, and caulking in each groove portion and engaging the associated strip part to grip the latter in place with respect to the cylindrical wall of the groove portion, the ends of the complementary arcuate portions of a sealing strip element and its caulking being contiguous when the parts of a fixed collar are brought together in assembled relation.

6. The combination with a housing having complementary parts providing an interior axially-extending opening and a spindle extending through said opening and separated from the wall of the latter by an annular space, of one or more cooperating pairs of radially overlapping fixed and rotatable collars extending into said annular space and carried by the housing and by the spindle, respectively, each fixed collar including complementary parts carried by the respective complementary parts of the housing and each fixed collar having one or more circular lateral grooves therein at a single side thereof and the grooves being on like sides of the fixed collars, each groove having a wall which is cylindrical and coaxial with the spindle axis and each groove including complementary portions provided in the respective complementary fixed collar parts, a cylindrical sealing strip element in each groove conforming to and seated against the cylindrical wall thereof and cooperating with the adjacent side of the cooperating rotating collar to define sealing clearance, each sealing strip element including complementary parts of relatively thin and flexible metallic strip material arranged in the respective complementary portions of each groove, and caulking in each groove portion and engaging the associated strip part to grip the latter in place with respect to the cylindrical wall of the groove portion.

CARL R. SODERBERG.